US011463650B2

(12) United States Patent
Curio

(10) Patent No.: US 11,463,650 B2
(45) Date of Patent: *Oct. 4, 2022

(54) DIGITAL DEPOSITION AND EVIDENCE RECORDING SYSTEM

(71) Applicant: CVISUALEVIDENCE, LLC, San Pedro, CA (US)

(72) Inventor: James Curio, San Pedro, CA (US)

(73) Assignee: CVISUALEVIDENCE, LLC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,220

(22) Filed: Sep. 21, 2020

(65) Prior Publication Data
US 2021/0006746 A1 Jan. 7, 2021

Related U.S. Application Data

(63) Continuation of application No. 16/431,900, filed on Jun. 5, 2019, now Pat. No. 10,819,945, which is a continuation of application No. 15/673,301, filed on Aug. 9, 2017, now Pat. No. 10,356,357, which is a continuation of application No. 14/884,707, filed on Oct. 15, 2015, now Pat. No. 9,762,847.

(60) Provisional application No. 62/064,200, filed on Oct. 15, 2014.

(51) Int. Cl.
H04N 5/77 (2006.01)
H04N 5/268 (2006.01)
H04N 5/232 (2006.01)
H04N 5/265 (2006.01)
H04N 9/82 (2006.01)

(52) U.S. Cl.
CPC .......... H04N 5/772 (2013.01); H04N 5/23203 (2013.01); H04N 5/265 (2013.01); H04N 5/268 (2013.01); H04N 5/77 (2013.01); H04N 9/8211 (2013.01)

(58) Field of Classification Search
CPC .......... H04N 5/77; H04N 5/772; H04N 5/265; H04N 5/268; H04N 5/23203; H04N 9/8211
USPC ........ 386/224, 223, 227, 230, 326, 338, 341
See application file for complete search history.

(56) References Cited

U.S. PATENT DOCUMENTS

| 6,097,441 | A | 8/2000 | Allport |
| 7,672,569 | B2 | 3/2010 | Horiuchi et al. |
| 9,686,497 | B1 | 6/2017 | Terry |
| 9,762,847 | B2 | 9/2017 | Curio |
| 9,802,129 | B2 | 10/2017 | Murdock |
| 10,356,357 | B2 | 7/2019 | Curio |
| 10,819,945 | B2 | 10/2020 | Curio |
| 2004/0105653 | A1 | 6/2004 | Horiuchi et al. |
| 2009/0129753 | A1* | 5/2009 | Wagenlander ......... G11B 27/10 386/326 |
| 2015/0317981 | A1* | 11/2015 | Yliaho ................... H04R 5/027 381/26 |

* cited by examiner

Primary Examiner — Robert Chevalier
(74) Attorney, Agent, or Firm — Buchalter; Cecily Anne O'Regan

(57) ABSTRACT

Embodiments include a modular video recording system. The system includes a first module for supporting a primary input to be recorded. The system may include combinations of modules for supporting different combinations of recording inputs from video and audio sources for recording the received inputs in different combinations.

18 Claims, 12 Drawing Sheets

DIGITAL DEPOSITION AND EVIDENCE RECORDING SYSTEM

PRIORITY

This application is a continuation of U.S. application Ser. No. 15/673,301, filed Aug. 9, 2017, which is a continuation of U.S. application Ser. No. 14/884,707, filed Oct. 15, 2015, now U.S. Pat. No. 9,762,847, which claims priority to U.S. Application No. 62/064,200, filed Oct. 15, 2014, each of which is incorporated by reference in its entirety into this application.

BACKGROUND

Conventionally, the legal profession uses depositions to obtain testimony from witnesses that may be used to gather evidence or to support their case during trial. Originally, the deposition was verbal, and a copy of the interaction was transcribed by a court reported to create a written record of the testimony. As technology advanced, in some cases, the deposition was also recorded to preserve the non-verbal responses of the witness.

Today, the verbal testimony is still captured by a court recorder. The court recorded maintains a written record of what is said during the deposition. Today, the non-verbal and/or visual testimony is generally captured separately by a videographer. The videographer typically sets up a camera on the deponent and coordinates with the court recorder to record the entire deposition experience. The videographer typically sets up different video recorders, microphones, and other equipment that must be positioned, maintained, and run independently during the deposition. Given the complexity of the system involved, whenever the record is started or stopped, it is not instantaneous to go on and off record. Instead, the different recording systems must be positioned and individually turned on and off. Configuring and initiating the first session is also immensely time consuming as each of the cameras and microphones need to be individually set up and configured to obtain the proper recorded account. It is also difficult to manage the system when a deponent moves or shifts during the exchange as the videographer must physically adjust one or more cameras to center the video on the deponent. The videographer may therefore become a substantial distraction or time consuming hindrance as they move around the room repositioning and checking various video screens and starting and stopping the various components of the system.

SUMMARY

Exemplary embodiments described herein provide a modular video system for recording events. The modular video system is configured to allow minimal set up and configuration even as additional equipment is added. Exemplary embodiments therefore provide a primary module for controlling a primary camera and recorder. A secondary module may be included to provide switching control between the camera of primary module and another input source either the switcher module or a third module, control of the one or more additional source inputs, individual recording from the one or more additional inputs, recording of a real time edited feed including combinations from the primary camera and the one or more additional input sources, and combinations thereof or additionally described herein. The system may expand the system by adding one or more additional sources through either the switcher module or a third module.

DRAWINGS

FIGS. 1A-1, 1A-2, and 1A-3 illustrate a front perspective, side perspective, and rear perspective view of exemplary embodiments of a primary module comprising an exemplary control case for the deponent camera and one or more interfaces described herein.

In FIG. 1B-1 the secondary module is coupled to the primary module, while FIG. 1B-2 the secondary module is uncoupled.

FIGS. 1C-1 and 1C-2 illustrate a deployed perspective view and collapsed perspective view of a third module comprising display and recording options as described herein.

FIG. 2 illustrates an exemplary display including a plurality of display regions.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments provided herein permit a module and integrated deposition system for recording a complete deposition exchange. Exemplary methods include recording a deposition exchange, creating a deposition event record, providing real time editing of a deposition video record.

Although embodiments of the invention may be described and illustrated herein in terms of a legal deposition exchange, it should be understood that embodiments of this invention are not so limited, but are additionally applicable to other recording situations. Exemplary embodiments may be used when a module deployable system is desired for using one or more inputs to create a video record. Exemplary embodiments are also described in terms of one or more modules. Components associated with each of the exemplary modules are not intended to be limiting. It is understood that components and/or features associated with any one module may be moved to, removed from, separated across, integrated into, duplicated in any other module, or otherwise distributed in any combination across any one or more modules.

Figures 1, 1A:
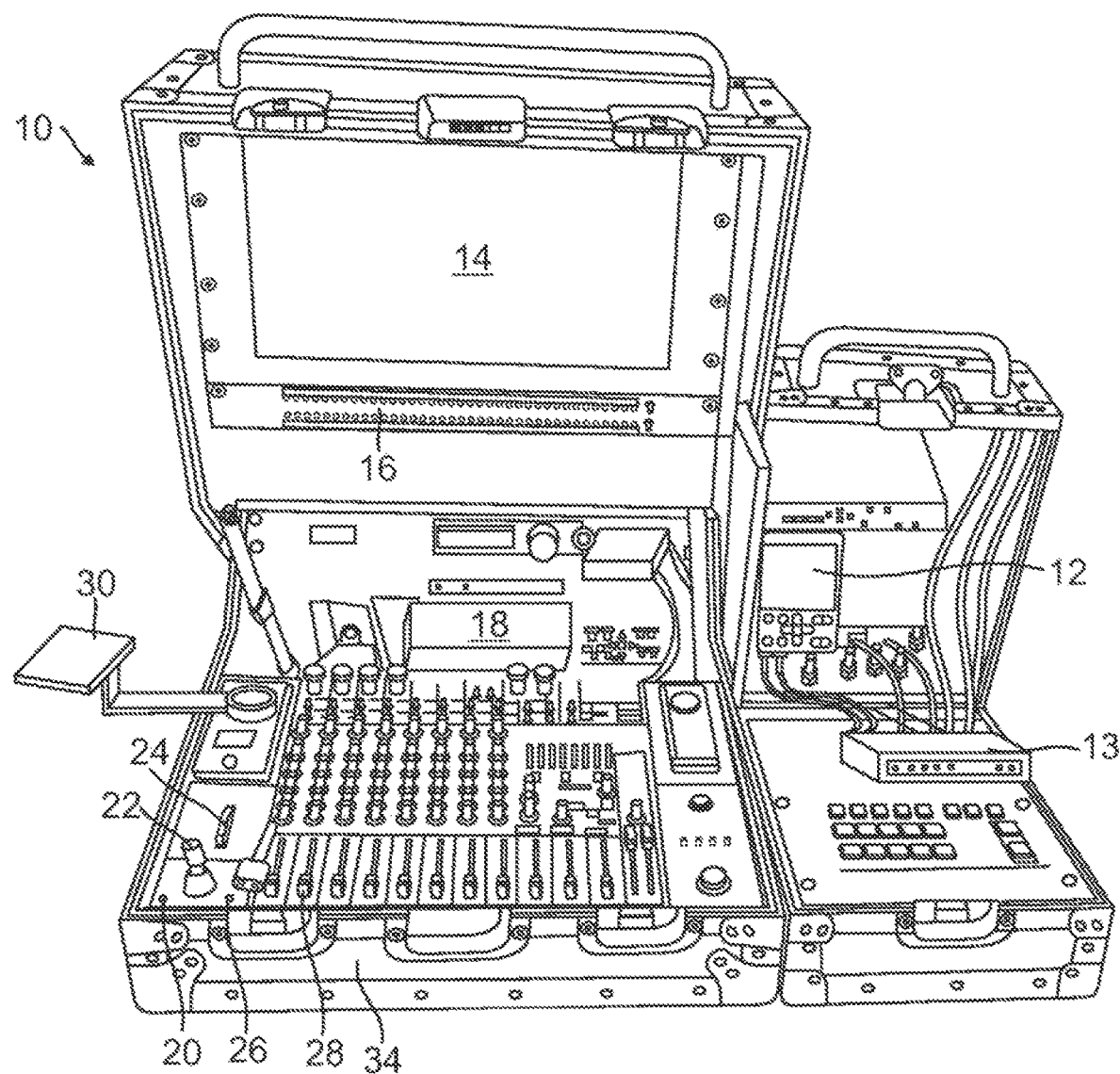
FIGS. 1B-1 and 1B-2 illustrate a front perspective and side perspective view of exemplary embodiments of a secondary module comprising a secondary control case for additional deposition and evidence recording options as described herein.
Figures 1, 1A, 2:
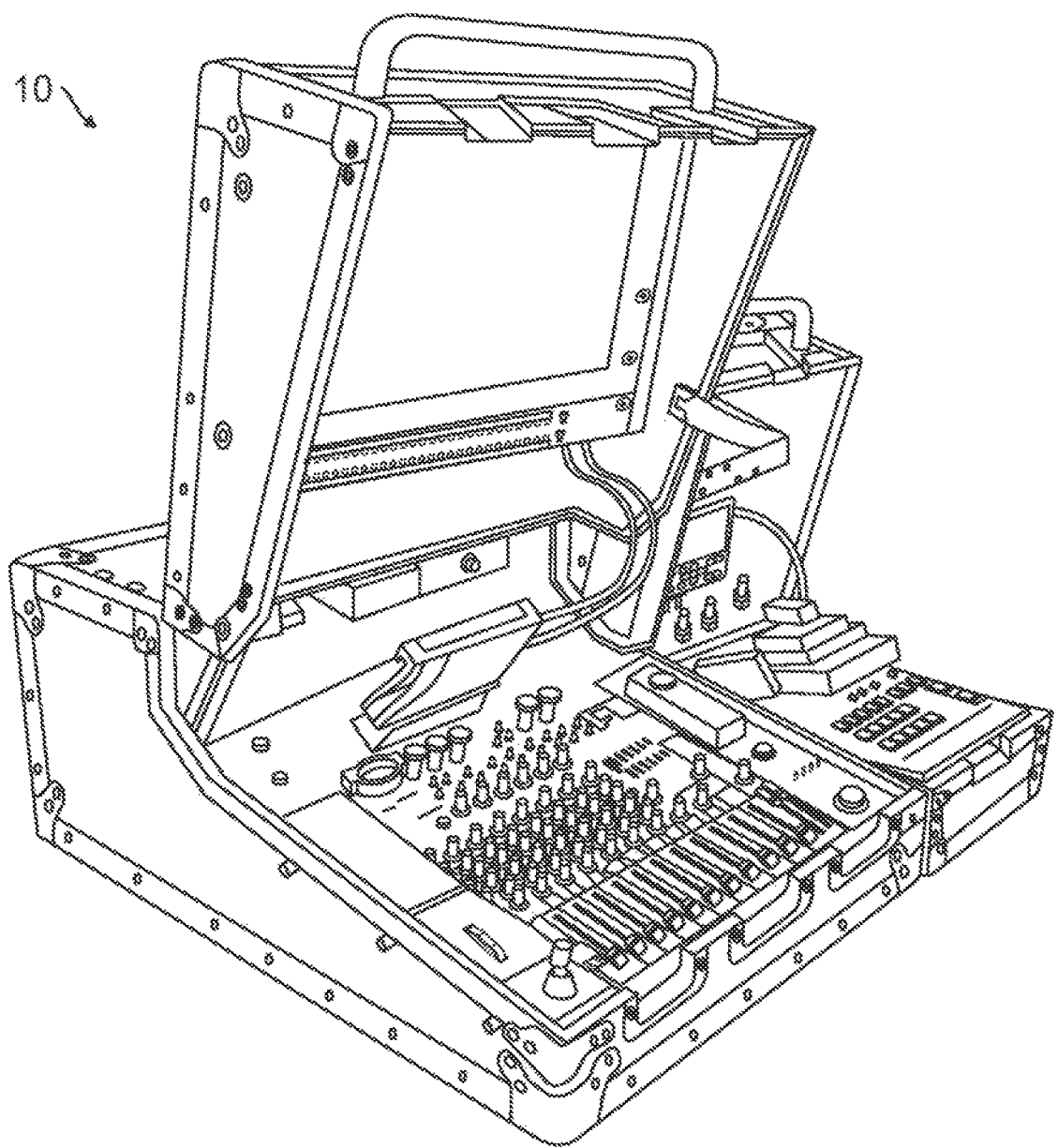
Figures 1, 1A, 2, 3:
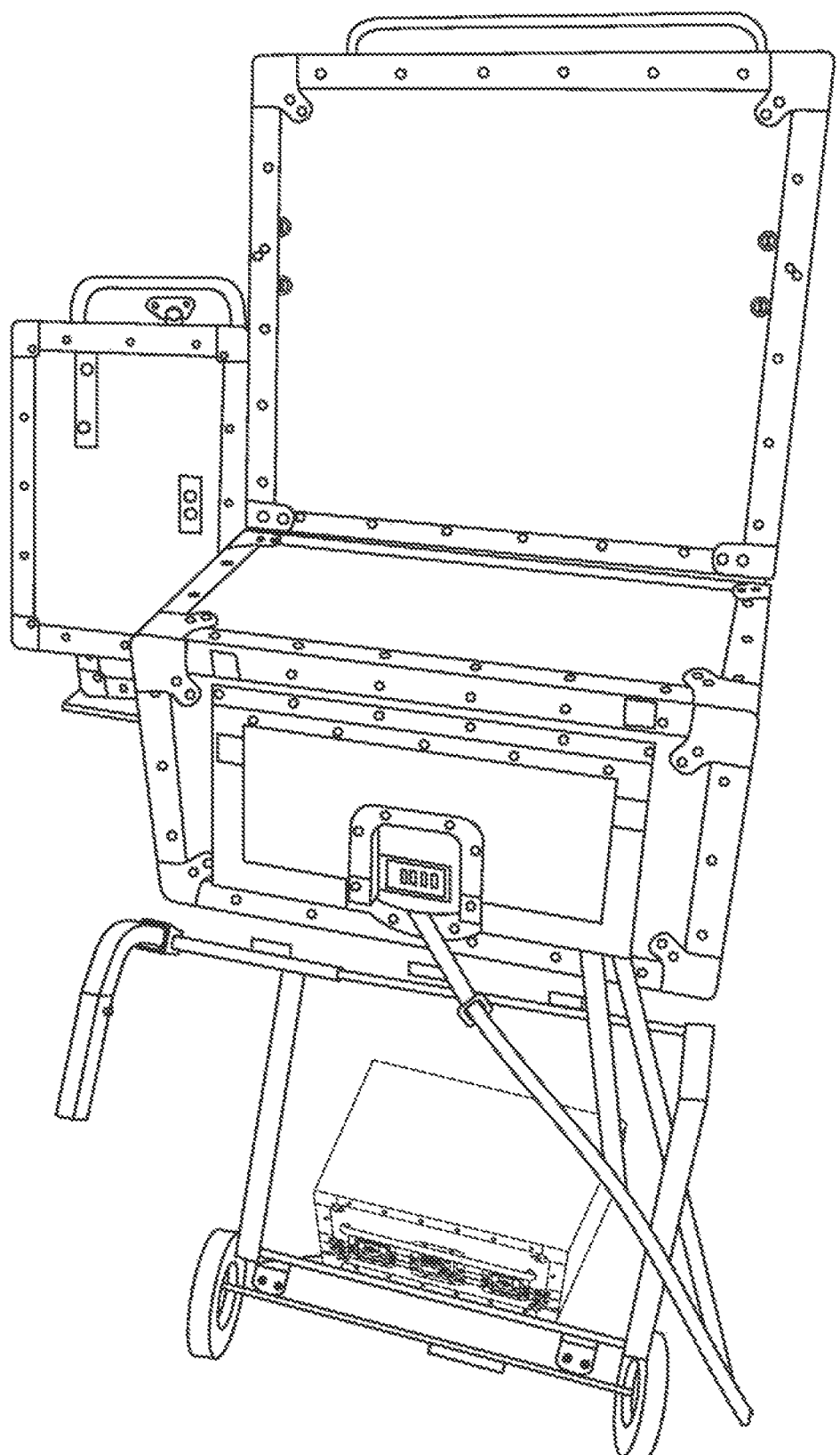
FIG. 3 illustrates an exemplary deployed arrangement of the one or more modules and system components described herein.
Figures 1, 1B:
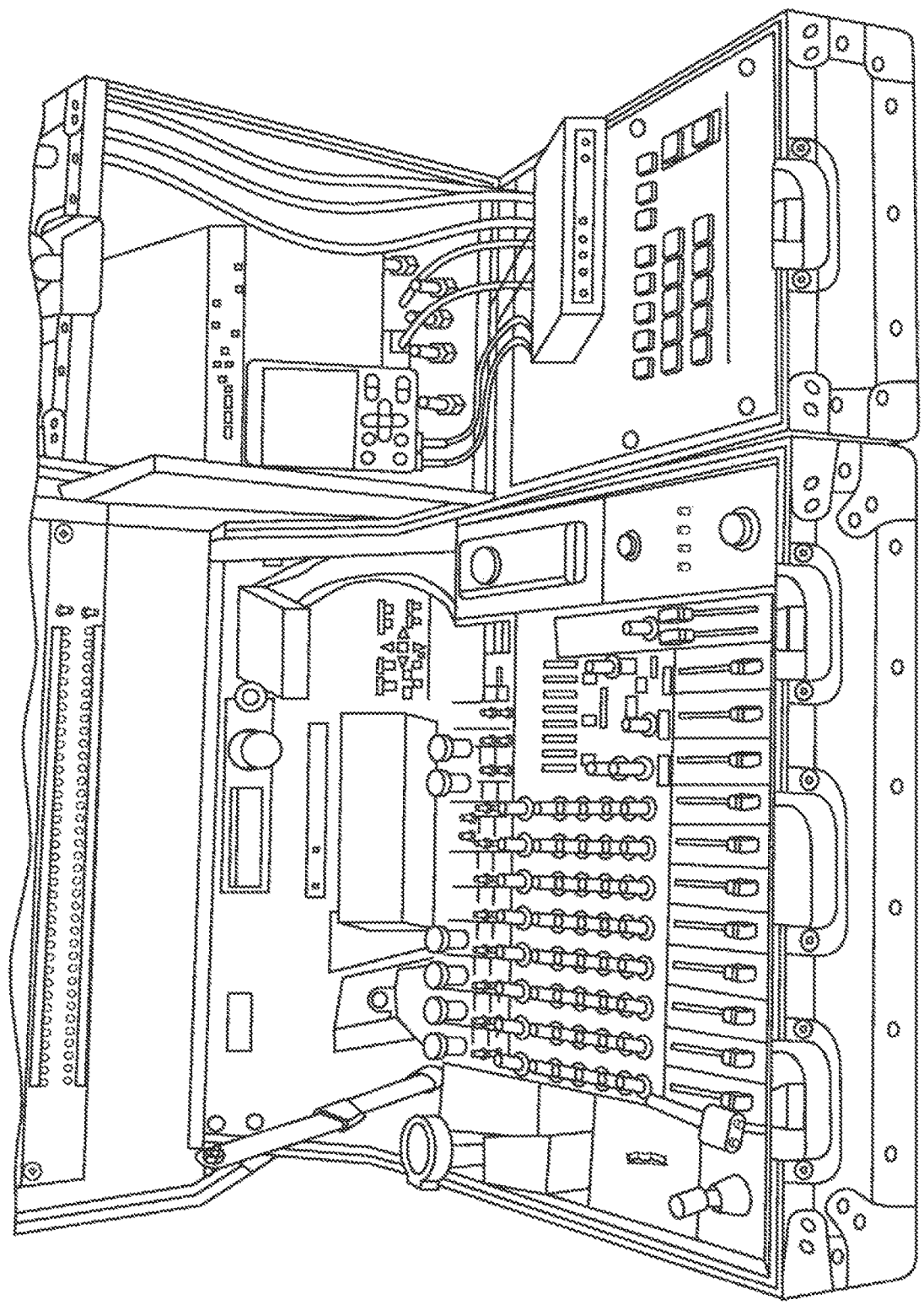
Figures 1, 1B, 2:
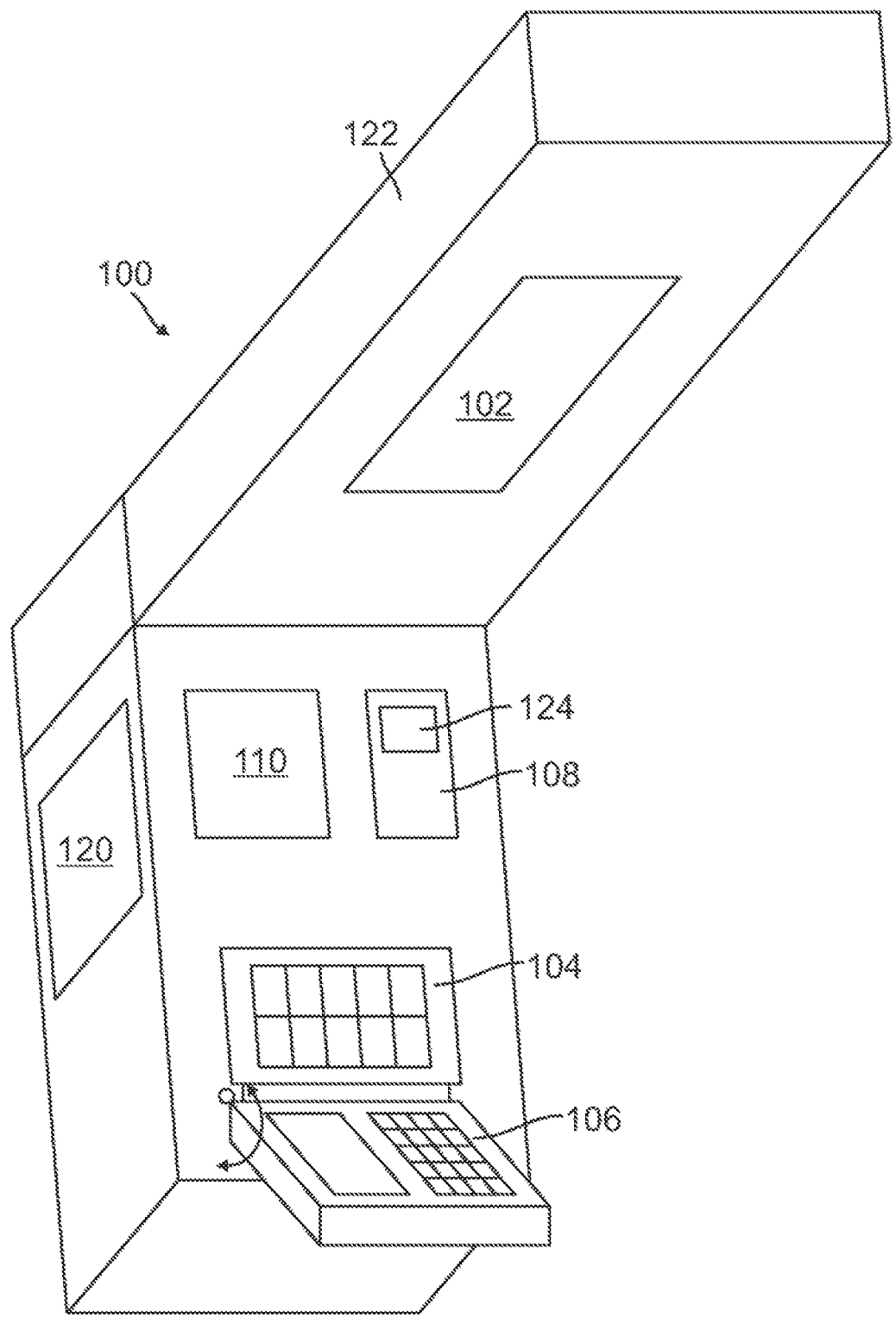
Figures 1, 1C:
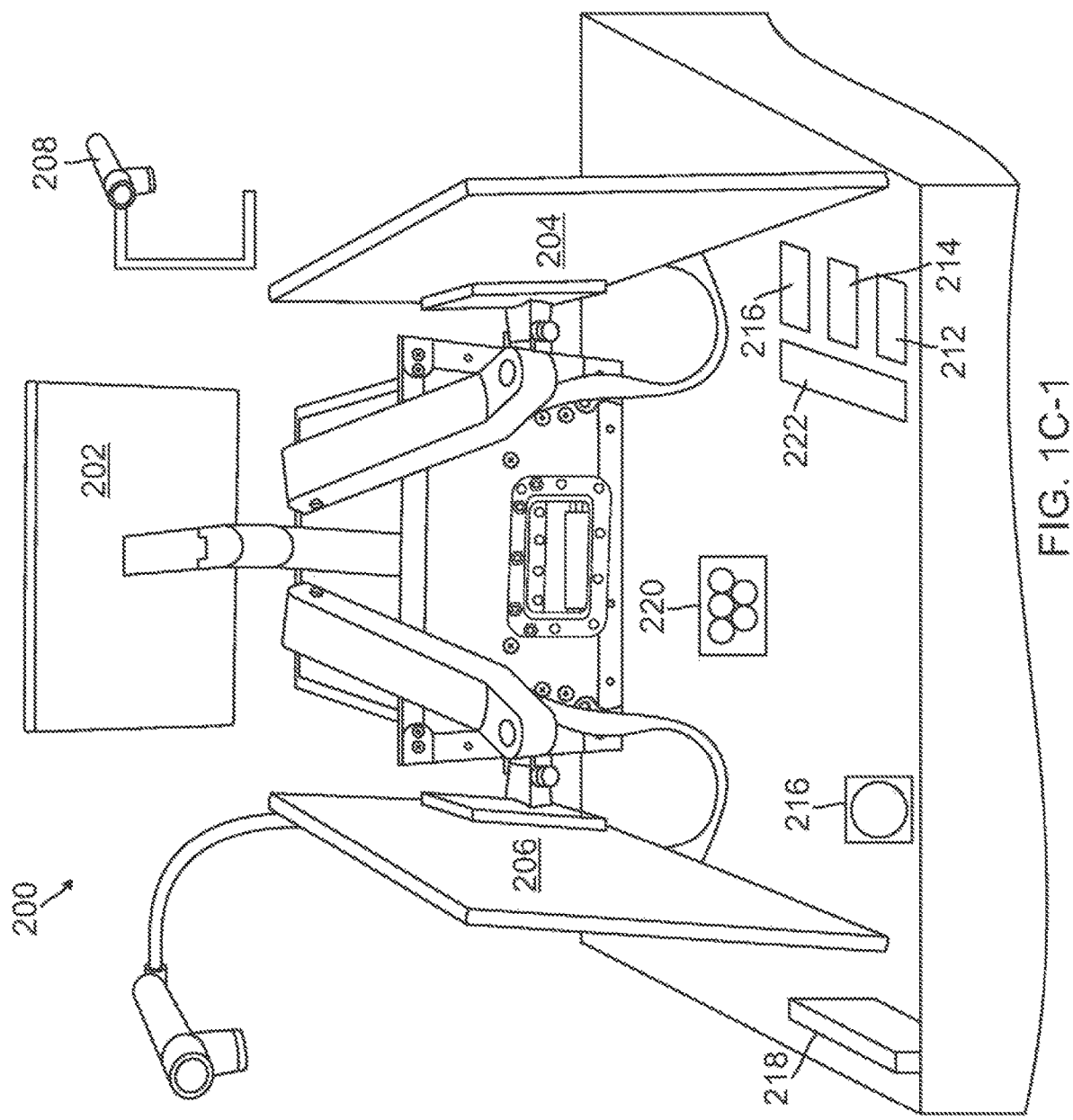
Figures 1, 1C, 2:
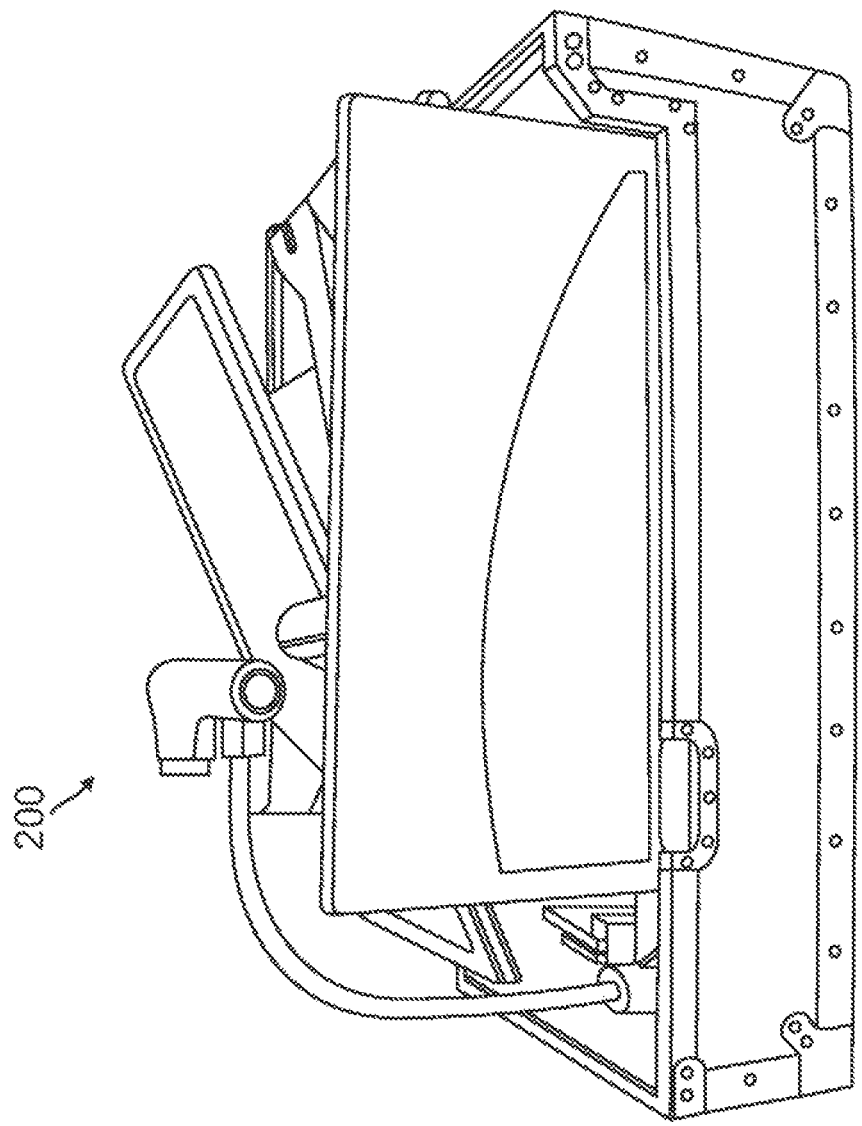
Figure 2:
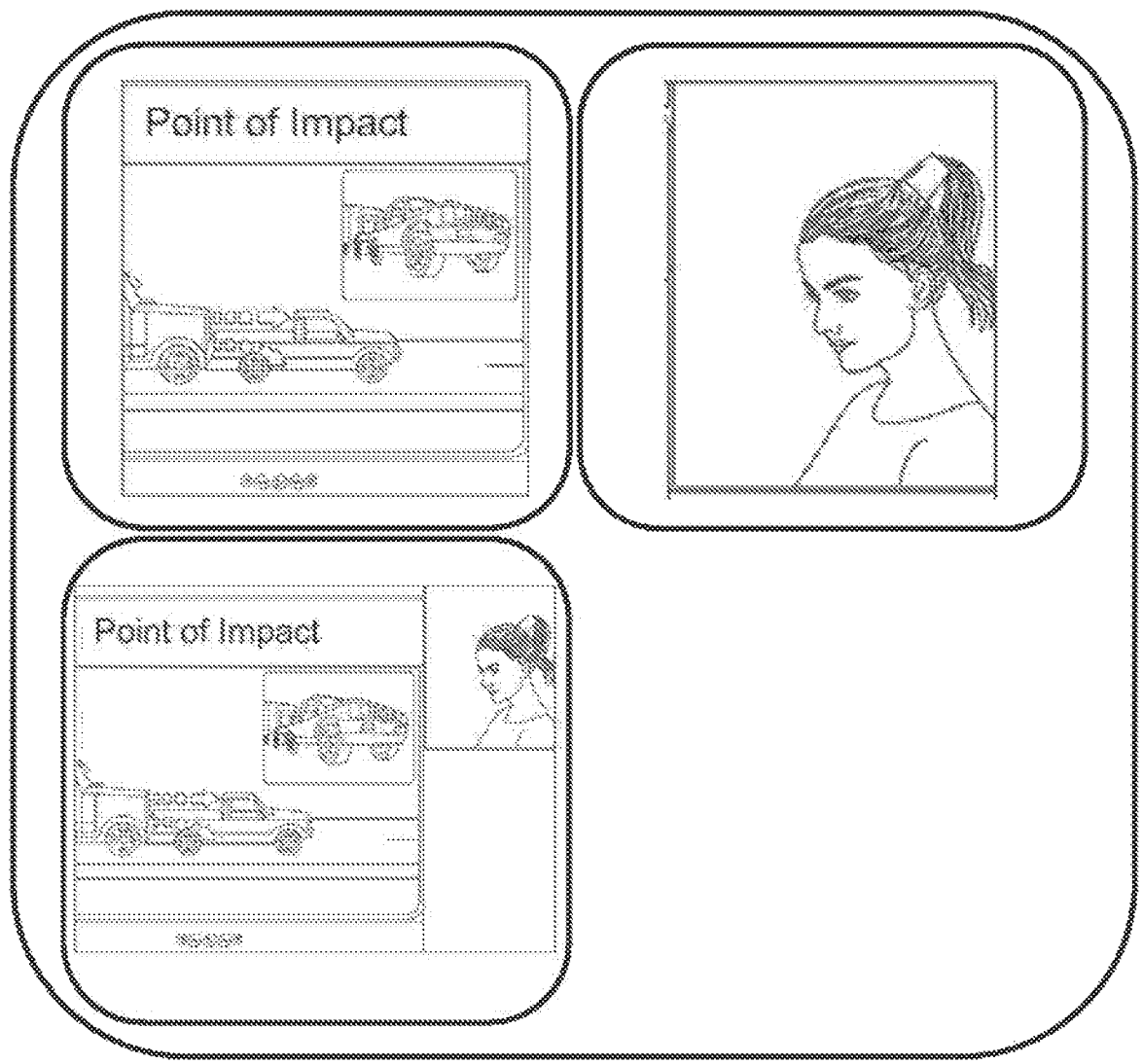
Figure 3:
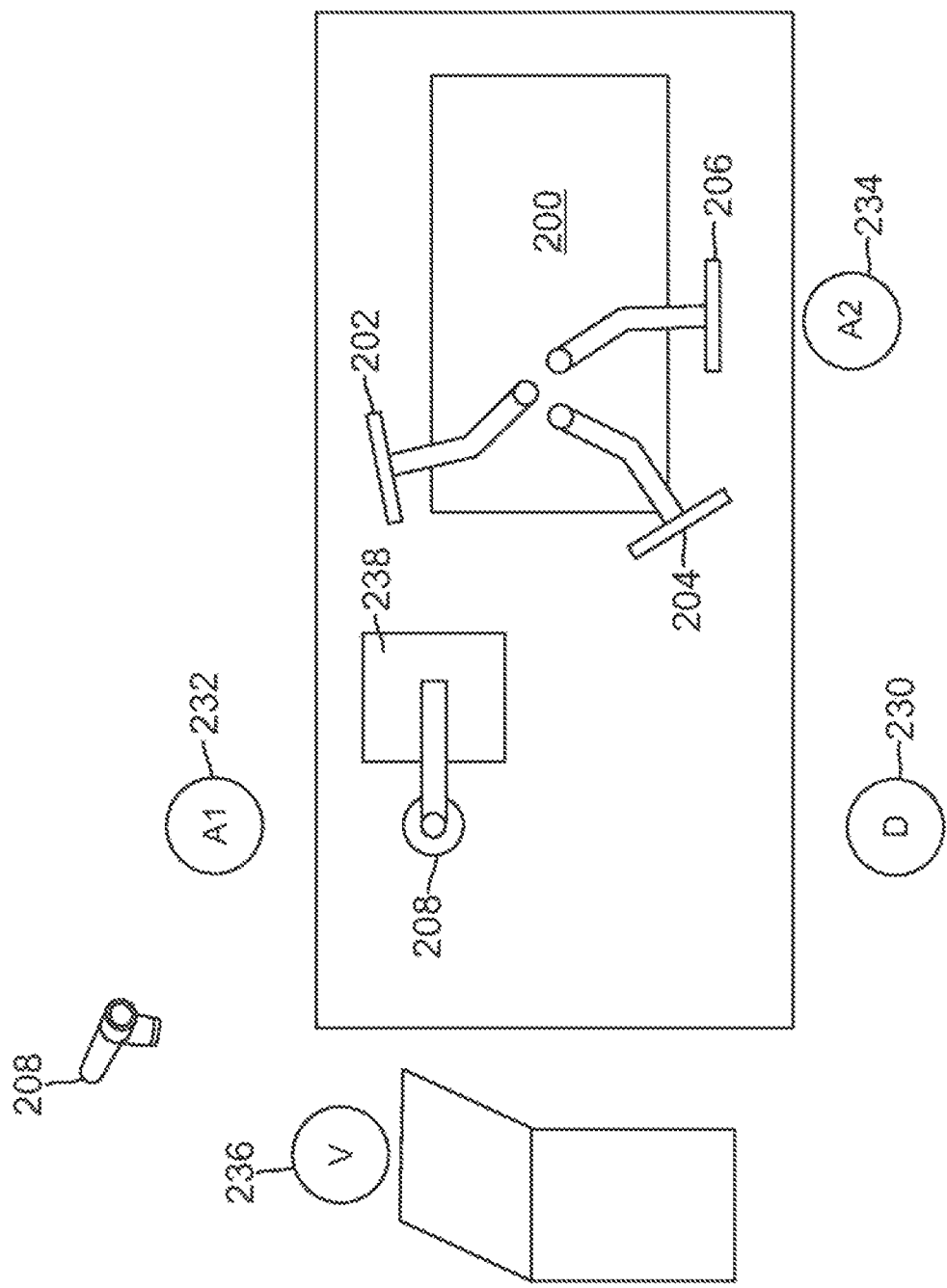

FIGS. 1A-1 to 1C-2 illustrate an exemplary modular deposition and evidence recording system according to embodiments described herein. The system includes a first primary module component as illustrated in FIGS. 1A-1 to 1A-3 comprising the control case for the deponent camera and one or more interfaces described herein. The system may include a secondary module component as illustrated in FIGS. 1B-1 to 1B-2 comprising a secondary control case for the additional deposition and evidence recording, such as that included in the third module. The system may include a third module component as illustrated in FIGS. 1C-1 to 1C-2 comprising video display and evidence recording interfaces as described herein.

FIGS. 1A-1 to 1A-3 illustrate a front perspective, side perspective, and rear perspective view of exemplary embodiments of a primary module comprising an exemplary control case for the deponent camera and one or more interfaces described herein. The primary module may include a set of primary feature of the modular deposition and evidence recording system. Exemplary features are illustrative only. Exemplary features may include, camera control functions, recording control functions, display functions, and one or more connection interfaces to permit communication with other systems. Features described herein in this or any module may be added, duplicated, removed, integrated, separated, or moved from one to another of the modules and remain within the scope of the present invention. Other features may also be added to achieve the desired combination of functions and flexibility to record the entire deposition experience, and any part thereof.

An exemplary primary module 10 may include one or more recording devices to record the deposition captured by the deposition and evidence recording system. For example, a first recording device 13 may be coupled to a camera (see FIG. 3) to record the images directly from the camera. One or more second recording device 18 may record a duplicate of the images directly from the camera or from the first recording device. The one or more second recording device(s) may also or alternatively record an on-the fly edited version of the deposition events altered by the videographer during the deposition. Exemplary embodiments of on the fly editing and recording are described further herein.

The first recording device 13 may be configured to capture an unaltered or altered image from the camera. Typically, display equipment used in the court setting are generally older, and have different aspect ratios from those of the more up to date recording systems. The recording camera may therefore capture wide screen images, while the display devices of the court present standard images. Exemplary embodiments of the deposition and evidence recording system therefore receive image formats in one aspect ratio and crop the image or manipulate the image to create and save a second, different aspect ratio. In an exemplary embodiment, the deposition and evidence recording system takes a signal from the camera, usually a wide screen aspect image, and manipulates and/or crops the image into a desired, common output, such as a standard aspect image. The first recording device 13 may save the original unaltered feed from the video camera, or may save the modified feed in the desired format and image aspect ratio. The first recording device 13 may include start and stop controls for manually controlling when the recording device records the native or altered feed from the video camera. The start and stop controls may be directly on the recording device and/or may be on a control panel of the deposition and evidence recording system. The first recording device 13 may also include an indicator, such as one or more LED lights, to visually confirm to a user when the recording device is on, recording, not recording, off, and any combination thereof. In an exemplary embodiment, the first recording device is powered by AC power to the deposition and evidence recording system.

The second recording device 18 may be a back-up recorder that may record a duplicate of the first recording device or may record another source or an altered video feed from one or more sources. The second recording device 18 may be automatically and/or manually controlled. In an exemplary embodiment, the second recording device 18 comprises a controller to set the recorded to record when the primary recorded is recording. The deposition and evidence recording system is therefore configured such that whenever the first recorder is recording, the second recording device is also recording without the user separately starting the second recording device. Similarly, the deposition and evidence recording system is configured such that the second recording system automatically turns off when the first recording device is turned off, without the second recording device being manually manipulated. In an exemplary embodiment, the second recording device also or alternatively includes a manual control such that the second recording device may be recording even if the first recording device is not recording. In an exemplary embodiment, the secondary recording device may comprise a battery, such that the second recording device, such that it is not harmed by a loss of power. In an exemplary embodiment, the second recording device is configured to turn off recording when an AC power loss is experienced by the deposition and evidence recording system.

The recording devices may be for audio, video, or a combination thereof. In an exemplary embodiment, the deposition and evidence recording system may include an audio recorder 32. The audio recorder 32 may be configured to save an output in a format consistent with a court reporter's system, such that a court reporter can download a completed audio file at the conclusion of the deposition directly from the module.

Exemplary embodiments of the recording systems permit continuous, no-break technology that allows continuous unlimited video recording, eliminating the necessity for the videographer to interrupt the deposition proceedings to change media units or DVDs. In an exemplary embodiment, the recording device may be a digital recorder that records directly to a memory location, which allows continuous recording for at least 8 hours, saving the recording in a digital format. The digital recorders may record in any digital format to a removable or downloadable medium, such as to a SD card, SSD card, thumb drive, local memory space, etc.

An exemplary primary module 10 may include one or more user interfaces to display information captured by the modular deposition and evidence recording system. For example, a first display 12 may be included on a first recording device 13. The first display 12 may display the images received from the camera or the image as would be recorded, such as an altered video image as described above to change an aspect ratio from a video feed to a desired format or aspect ratio. In an exemplary embodiment, the first display 12 is configured to display the image as received from the camera. The first display 12 is also configured to indicate the image that is to be recorded, or to be incorporated into the finished recording. For example, the displayed image may include lines or other indicators to show what portion of the image is or will be cropped on the recorded device or on the final product. In an exemplary embodiment, the display shows a full screen aspect image and includes vertical lines indicating an image at a standard aspect ratio. Therefore, a videographer, may see images at the periphery of the recorded image as seen from the camera. This area may be recorded and cropped during final production editing by the videographer, or may be edited in real time by the system recorder. The videographer may therefore reposition the camera on the deponent if other objects begin to encroach on an edge of the image before they are shown on the final image.

An exemplary primary module 10 may include a second display 14 for showing one or more depictions of the video in process in a central location. FIG. 2 illustrates an exemplary display including a plurality of display regions. Each of the plurality of display regions is configured to display one or more images from one or more input devices, and/or one or more on the fly edited video for immediate production or near finished and immediate production. For example, as shown, a first display region may display the image as captured from a first camera directed at a deponent; a second display region may display the image as captured from a document or evidence camera; a third display region (not shown) may display the image as captured from a second camera, such as may be directed at the questioning attorney, another evidence source, or elsewhere. A final display region may display an image as manipulated by the videographer to create a semi-final or edited video stream comprising different images from the one or more sources as selected dynamically, in real time, as described herein. For example, as described herein, the videographer may select directly from one or more video sources (such as those shown in display regions one through three). The videographer may also select a combination of video sources, such as by using a picture in picture arrangement. The videographer may select in real time a combination of sources and/or image arrangements that make the most sense given the current testimony, topics of discussion, action of the deponent and interacting attorney, displayed evidence, and available sources.

An exemplary primary module 10 may also include other display information relevant to the recording. For example, an audio bar 16 may indicate the feedback received on one, two, or more audio channels as detected through one or more microphones. Other feedback interfaces may include, for example, spectral analysis, such a frequency, amplitude, range, etc., associated with a video image. The contrast, brightness, lighting, arrangement, etc. may be altered through the control console or at the associated equipment to adjust the image as desired.

An exemplary primary module 10 may also include control features to control one or more system components and/or image and/or audio input, output, or stream. For example, the module 10 may include a mixer 28 for adjusting the audio signal received from one or more microphones. The module may include one or more video controller 22, 24 for controller a direction, tip/tilt, and/or zoon of a camera. Controls may be in any input form, such as a joystick, buttons, track ball, touch pad, wheel, switch, etc. The console may include one set of controls that may control one of a plurality of camera inputs, or may include a dedicated set of controls per camera input. The module may include one or more selection buttons 26 for toggling between the respective available cameras and alternative display arrangements. For example, the system may be configured that a primary image will be maintained on the display as a primary image. The primary image may be that of the deponent. The selection button 26 may then be pushed to alternate the displayed, on the fly edited image to be either that of the deponent or that of a picture in picture including the deponent and an image from another camera, such as that displaying evidence. The videographer may therefore select on the fly combinations of images to record. In an exemplary embodiment, the videographer may select a deponent when the deponent is asking questions. The videographer may select a picture in picture combination of deponent and evidence, when the deponent is looking at something presented by the questioning attorney. Therefore, the video can capture the most relevant combination of information including the deponent and/or whatever the deponent sees or is discussing.

The audio mixer may have voice limiters for consistent sound, audio distribution amplifiers with calibrated line/mic level correction feed to each device and select monitoring of each audio and video component. There may be a stereo audio delay unit to allow synchronization of the live audio with the delayed video being recorded in any of the exemplary modules.

An exemplary embodiment includes one or more universal control button(s) 20. The universal control button may be used to simultaneously turn on, turn off, pause, or restart a recording session across all recording/display devices. For example, if the system is using a plurality of cameras and/or a plurality of recorders to record a deponent, an evidentiary document, other evidence, the questioning attorney, and any combination thereof, the videographer may press the universal control button to start each of the recording devices and/or cameras simultaneously. This permits the start, stop, and pausing of a session to occur quickly and efficiently. Also, each of the recording devices will have the same time log/stamp for easier video alignment and editing. Conventionally, when a videographer must individually and sequentially turn on and off respective devices, the videographer cannot simply navigate to the same time stop on the respective recordings to get to the same occurrence on each of the videos. Therefore, if the videographer wants to align the videos to permit after recording editing, the videographer must verifying the time delay between videos before such editing can occur.

The primary module 10 may also be equipped with an on-board portable computer to record entries, to connect and control the various recorder and components and to process and encode video files in the field. The computer also allows the streaming of deposition video to remote locations via video conferencing and enables remote technical support access to the system. The computer may be any suitable computer for the system, including a compact laptop or tablet, mounted on a swing arm that folds up and stores over the microphone mixer and swings outboard for use during the deposition. This computer is connected to an on-board USB hub and ethernet router/network enabling connection to all electronic devices and the internet.

Other features may also be included within the exemplary primary module 10. For example, stands or mounts 10 may be included to support additional components. As shown, a mount 30 may be pivotally coupled to the module to permit a docking station, such as that for a laptop or tablet to be integrated into the module. The module may include other input/output interfaces to permit expanded use or coupling of external devices. In an exemplary embodiment, the module may include a telephone jack to send and receive signals through the module. In an exemplary embodiment, the module may include a microphone and/or speakers such that the system may permit a teleconference through the device. In an exemplary embodiment, the module may include an audio or video jack to permit the receipt or transmission of one or more video or audio signals. The module may also include internet or other network connection jack for communication electronically. Embodiments may also include communication through Voice Over IP (VOIP). Other input/output interfaces such as universal serial bus (USB), serial ports (RS232), Red Green Blue (RGB) video, co-ax, audio/video, or other ports may be included to support communication with one or more other devices.

Such a configuration may permit remote depositions. In an exemplary embodiment, the received audio signal may be directly recorded from the signal input to the speaker as it is being broadcast from the speaker for a clearer audio recording. The system may therefore be used to support remote video conferencing through an input/output interface or may permit real-time or semi-real time streaming of one or more of the recorded or received video and/or audio signals, such as, for example, the on the fly edited video composition.

Exemplary embodiments of the primary module 10 include a camera system for recording a deponent. The recording system may be a remote controlled compact high-definition POV (Point Of View) camera connected via a single camera cable to a high-definition video recorder. In this embodiment, all camera functions may be remotely controlled through the primary console interface and controls. The compact POV camera may be installed on a compact remote controlled motorized pan and tilt unit. The variable speed pan and tilt may be controlled with a console mounted joystick (or other user control interface) for up/down/left/right and diagonal in all directions. The pan and tilt speed may be controlled by a console mounted speed control dial that adjusts the up/down/left/right movement speed. The POV camera's variable speed zoom lens is controlled by a console mounted joystick (or other user control interface) for in/out. The zoom lens speed may be controlled by how much pressure is placed on the joystick: a little pressure will yield a very slow zoom and more pressure will zoom more quickly, in or out. This unparalleled camera control enables the videographer to react and implement camera adjustments with unprecedented speed and accuracy, much sooner than a typical videographer reaching for a tripod mounted camera.

The exemplary camera system may comprise a camera stand including a vertical telescoping stand with a crows foot type base requiring a much smaller footprint that is easy to position. An adjustable quick release enables quick installation and removal of the P&T head and camera. The contemplated primary console 10 connects to the P&T camera via a camera umbilical cable carrying the camera signal and camera remote control functions, as well as the P&T control and power. There may also be power run for an optional camera light.

With the use of the camera umbilical cable, the compact camera and tripod combination can be placed away from the videographer and much closer to the questioning attorney allowing a more direct angle of the deponent. Accordingly, the position of the camera relative to the deponent can be selected for the best shot composition and not for the convenience of controlling the camera.

An exemplary primary module 10 may include one or more connectors, for sending and retrieving data from the module. In an exemplary embodiment, one or more connectors are grouped into one or more conduits for easy control, manipulation, and positioning of the connectors within the conduit. The conduits may be groups, such as, by their purpose or intended location. For example, a camera conduit may group all of the necessary cords needed between the module and the camera. In an exemplary embodiment, a camera conduit includes one or more connectors for connecting to a camera for controlling the camera (such as zoom, power, recording), for controlling the position of the camera platform (such as the tilt and rotation), and for providing power to the camera. In an exemplary embodiment, a court reporter conduit includes a cable with a headphone jack at a terminal end to permit the court reporter to plug into the microphone/audio feeds, an analog and/or digital audio jack to permit the stenographer's machine to receive an audio signal, USB cable to permit the court reporter to plug into the audio recorder 32 to download the desired audio file, etc. An exemplary embodiment, an audio conduit is provided for grouping extra-long, such as 25 foot or longer, light weight cables to support the microphones, such as those worn by the deponent, questioning attorney, or other attorney(s). The module may also include a power cord for receiving and providing power to one or more of the components supported thereby.

Conventionally, a videographer provides the court reporter a live audio feed and/or a digital audio recording of the deposition proceedings, for reference. In an exemplary embodiment, the court reporter's conduit may therefore be a multi-cable snake that carries audio and USB signals to the reporter's station. The conduit bundles one or more cables that carries a two channel multi-track audio being recorded on the video, in several audio levels to ensure compatibility with more reporters. The adjustable audio is provided at microphone and line levels via a stereo mini cable that plugs into any laptop via the microphone/audio input jack with easy integration into the reporter's existing stenography software. There is also a headphone jack that provides undelayed audio for headphone monitoring. There is also a USB digital audio feed direct from the audio mixer providing a full digital live audio signal using generic USB audio drivers standard on most computers.

If the reporter does not use the live audio or headphone feeds, the videographer can create a MP3 or WAV digital audio recording for delivery to the reporter via USB cable. A USB cable may therefore be looped through the reporter's cable conduit and provide the reporter a USB connection. Normally, the USB cable loops power from the primary module to the USB powered digital audio recorder. At the conclusion of the deposition, the reporter simply unplugs the looping connection, and plugs the USB cable into her laptop. This powers up the USB digital audio recorder and automatically presents the recorder's data folder for copying to the reporter's computer.

In an exemplary embodiment, the primary module 10 may include a plurality of microphones for receiving audio signals from one or more sources. In an exemplary embodiment at least three microphones are provided for exemplary participants in the deposition (e.g. the deponent, the questioning attorney, and the defending attorney). In an exemplary embodiment, the system is configured to record in stereo, or on two separate audio channels. The microphones may be configured to record on one, the other, or both of the audio channels. For example, the microphone from the witness may be configured to record on both audio channels, while the microphones to each of the attorneys are configured to record on single opposite channels.

A contemplated system features at least two independent audio channels, configurable into several recording modes on the fly, including but not limited to, 1 and 2 channel monaural, 2 channel stereo and 2 channel multi-track. The one and two channel monaural recording mode is the current standard of the industry placing all deposition participants on the same audio channel(s). In this mode, if an attorney and the deponent speak simultaneously, their audio is merged into a single recorded audio track, usually resulting in a poor or unintelligible audio record. Once this unintelligible recording is created, there is typically no solution to recover or separate the audio and many times enhancement is useless.

Exemplary embodiments described herein produces a realistic stereo recording of the deposition, placing the participant's audio in the respective sound field position, center, left and right, as if the viewer were sitting in the room across from the deponent. Exemplary embodiments address the typical catastrophic problem of participants speaking at the same time, which is usually associated with an attorney interjecting an objection between the question and deponent's answer. Many times this objection is spoken simultaneously over the deponent's answer, making the deponent's answer incomplete or unintelligible.

A contemplated two-channel stereo configuration records the deponent's audio on both a first and second, or left and right audio channels simultaneously, while the questioning attorney is recorded on a single channel and all other attorneys are recorded on the other channel. If the objection is spoken simultaneously with the deponent's answer, the interfering audio can typically be eliminated so the deponent's answer will virtually always be clear and uninterrupted. The interfering audio can be eliminated in one of two ways. The first method is performed during the trial presentation, when the trial technologist momentarily mutes the respective audio channel (left or right) eliminating the offending audio track, resulting in clear uninterrupted testimony. This requires no advanced editing and is done on the fly during the presentation with the help of a list or log of interfering audio instances. Alternatively, computer video editing software can be used to remove the offending audio permanently, eliminating the need for on-the-fly adjustments in court. Log entries of audio interference may be generated as disclosed herein.

An exemplary primary module 10 may include a housing or case for containing and/or supporting the exemplary features described herein. The exemplary components may be configured within system to provide easy set up. For example, the case may include a hinged lid. In an exemplary embodiment, one or more of the display interfaces is positioned within the lid. When opened, the lid may be positioned to provide easy viewing of the depicted images. A base portion of the module may include one or more of the controls or other features described herein. The system may therefore simply be opened, positioned, and plugged in to provide efficient set up.

An exemplary primary module 10 may also include an interface for coupling one or more other modular components such as those described herein. The coupling interface may include communication interfaces such that the additional modules may communicate with the primary module, and/or physically attach and/or support the one or more added modules.

An exemplary primary module includes controls and connections to support the primary camera for the deponent and a plurality of microphones for all participants. The primary module may therefore be configured to support the simplest video deposition arrangement. Exemplary embodiments of the switcher module permit the expansion of the primary module to support addition cameras, displays, input/outputs, etc. FIGS. 1B-1 and 1B-2 illustrate a front perspective and side perspective view of exemplary embodiments of a secondary module comprising a secondary switcher module for additional deposition and evidence recording options as described herein.

In an exemplary embodiment, the switcher module 100 includes one or more displays 102 to display a video feed from the one or more additional cameras or visual inputs, and/or one or more on the fly edited and/or combined video feeds. A single display may be used to display any one of a plurality of video inputs, or a separate display or portion of the display may be used to correlate a given display or portion thereof to a given input. In an exemplary embodiment, the switcher module 100 includes a first display 124 (integrated with a recording device) that displays a first video image. A second display 102 may provide a larger display for showing the first video image or a separate second video image. For example, a first display 124 may be configured to display a raw video image from a camera or other visual input source, while the second display 102 may be configured to display a combined or on the fly edited version or variable selected combination of one or more input video feeds. The one or more displays may be configured to display the recorded image of one or more recording devices 108, 110. Similar to the primary module, the switcher module 100 may include a primary recording device 108 and back up recording device 110. In another example, the recording device 108 may be configured to display and record the output from the switcher module (i.e. the real time edited video combination), while the back up recorder 110 creates a duplicate recording of the 108 recording, while the display 102 can be configured to display any input source. The recording devices may record the same video stream or may record different video streams. The recording devices may be manually or automatically controlled, and may or may not be coupled such that control of one controls one or more other recording devices. The recording devices may be battery operated to provide an uninterrupted recording during power interruptions. In an exemplary embodiment, the secondary recording device may comprise a battery, such that the second recording device, such that it is not harmed by a loss of power. In an exemplary embodiment, the second recording device is configured to turn off recording when an AC power loss is experienced by the deposition and evidence recording system.

In an exemplary embodiment, the switcher module 100 also includes one or more controls 104, 106. The controls 104, 106 may include buttons, toggles, switches, joy stick, touch pad, track ball, other input devices, and any combination thereof to control the one or more other input/output devices connected through the switcher module 100. The controls may be used to select the on the fly edited configuration of an intermediate video stream, such as selecting a primary image for display, a combination of images to display, a picture in picture arrangement, etc. The controls may also be used specifically manipulate, control, or otherwise provide input to the coupled input device. For example, the controllers may rotate, zoom, or otherwise orient an additional camera coupled through the switcher module. The controls may be used to select a given input and couple control to the primary module. For example, a first additional camera may be selected at the switcher module, which permits control of the first additional camera through the controls 22, 24 of the primary module 10. In an exemplary embodiment, a first and second control pads 104, 106 are rotatably connected about a hinge, such that an extension panel 106 may rotate and expand the control console and provide access to the controls of both panels 104, 106. For example, control pad 104 may comprise a switcher to select the output for the switcher module, while control pad 106 may be a remote control for the plurality of displays (such as for the annotation feature described below 222), the remote control for the additional camera (such as pan, tilt, and/or zoom for the document camera 208), and/or the video switcher described below with respect to the third module 216. The controls may then stow to protect the control interface and provide a compact storage configuration of the module.

In an exemplary embodiment, the switcher module 100 also includes a housing 122 for containing the electronics, input/output, and other components of the switcher module. The housing includes a lid and base rotatable coupled for containing and storing the console components. The switcher module may be configured to have a low storage volume configuration and a deployed configuration. The deployed configuration is configured such that the case supports the various components in a use position. For example, the lid may be configured to have a selectable position that supports one or more of the displays. The housing 122 may also include an exterior interface 120 for coupling the switcher module 100 to the primary module 10. The exterior interface 120 may have a mating interface for physically and directly coupling the switcher module 100 to the primary module 100. Alternatively, or in addition thereof, the exterior interface 120 may electronically couple the switcher module 100 to the primary module 100. For example, one or more connectors and/or cables may be used to couple the switcher module to the primary module to create the requisite electronic communications necessary for the desired configuration and control of the system. The primary module may also or in addition thereto include a mated interface that similarly corresponds to the interface of the switcher module to provide the desired physical and/or electronic connections.

FIGS. 1C-1 and 1C-2 illustrate a deployed perspective view and collapsed perspective view of a third module comprising display and input/output options as described herein. In an exemplary embodiment, the third module 200 is used in conjunction with the switcher module 100. For example, the third module 200 may provide the video/audio feeds controlled by the switcher module 100. In an exemplary embodiment, the switcher module 200 includes one or more ports or connectors for directly receiving one or more video/audio signals.

In an exemplary embodiment, the third module 200 includes one or more video input devices, such as a camera 208. In an exemplary embodiment, the camera 208 is configured as a document or other evidence camera, although other or conventional video devices may be used in addition or alternatively thereto. The camera 208 may be communicatively coupled to the third module 200 or switcher module 100, such as by wire or wireless communication. Other input devices may be used or incorporated therein. In an exemplary embodiment, a mobile input device 218 may be communicatively coupled to the third module 200 or switcher module 100. Other input devices 218 may include mobile devices, such as a smart TV, tablet, laptop, etc. The mobile device may permit wired or wireless communication to the switcher module 100 or third module 200. The third module 200 may include one or more communication interfaces 212 to permit wired or wireless communication between the one or more input devices 208, 218 and the system.

Figure 4:
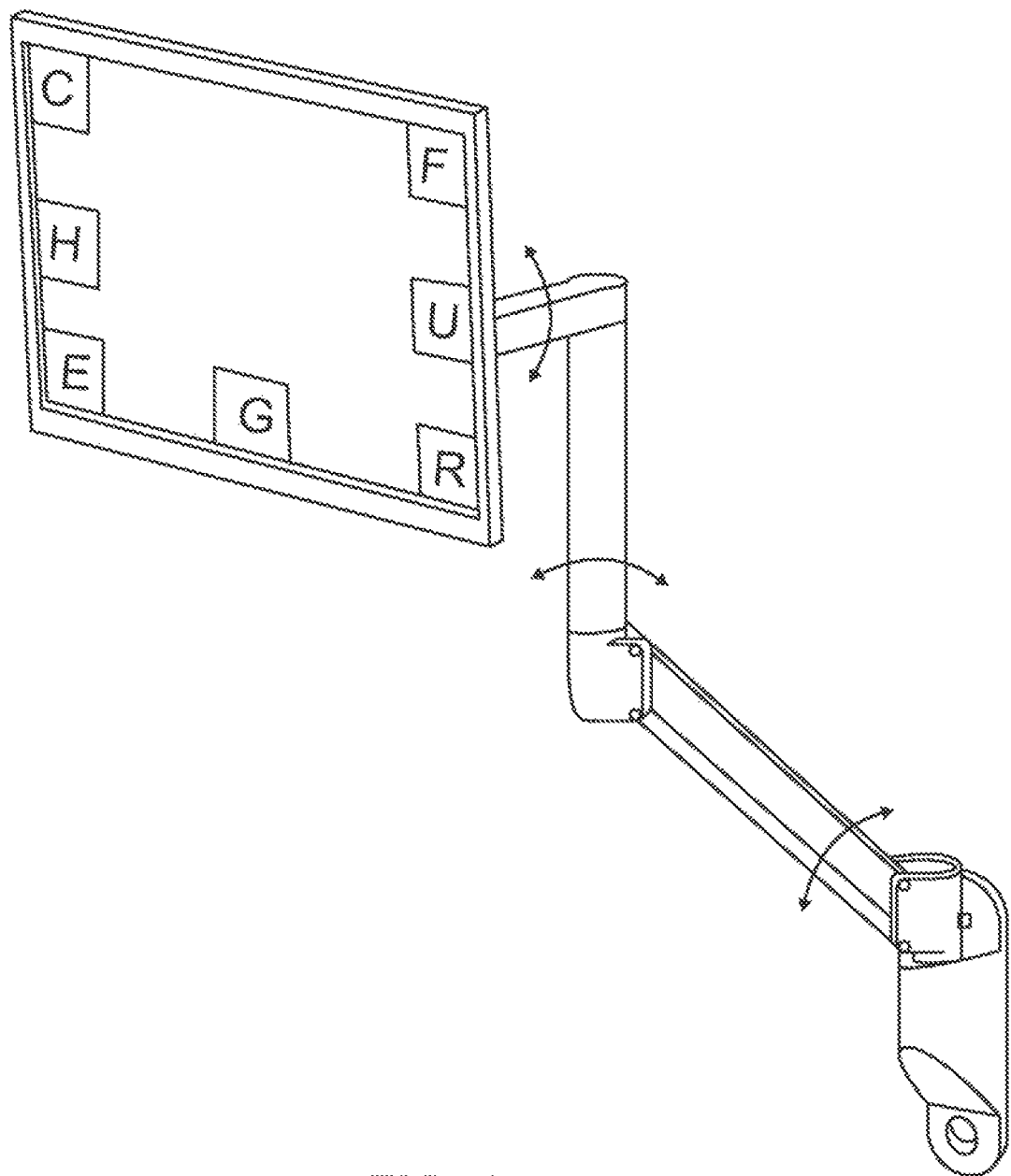
FIG. 4 illustrates an exemplary configuration of a display device having dedicated control regions for manipulating and/or controlling one or more images on one or more of the display devices.

In an exemplary embodiment, the third module 200 includes one or more display devices 202, 204, 206. As shown, three display devices are included for each of the participants of the deposition (e.g. the deponent, the questioning attorney, the defending attorney). The display devices may be used to show images from one or more of the input sources. One or more controls communicatively coupled to the switcher module 100 or third module 200 may be used to select which images are displayed on the one or more display devices. The one or more display devices may be controlled by the switcher module 100, the display device, a remote controller, or other input/output device. As shown in FIG. 4, the display devices 202, 204, 206 may be mounted to the third module 200 by an articulating arm. The articulating arm may permit rotation, extension, and/or translation in three dimensions. As shown, the articulating arm includes a base coupled to the third module 200. The based permits rotation around a longitudinal axis of the base arm. A second arm is pivotally coupled to the base, while a third arm is rotationally and pivotally coupled to the second arm. As shown, the connection between the second arm and third arm includes two separate pivotal axis and at least one separate rotational axis. The third arm then couples to the monitor through another set of pivotal, rotations, and/or extendable connection. Any combination of articulating arm may be used that can be configured or positioned to compactly fit within a closed third module and deployed to position the display devices in a desirable display configuration (such as that illustrated in FIG. 3.

In an exemplary embodiment, the display devices are configured such that one display is configured as a primary display and the other displays as secondary displays. The primary display may be used to control the secondary displays. For example, the displays may be touch screens permitting input through contact with the display screen. The primary display may have controls or touch locations configured to project or share the image from the primary display onto the secondary displays. Similarly, the primary display may be used to remove the projected image, or present a dark screen on the primary and/or secondary displays. The primary and secondary displays may also be similarly controlled through a controller communicatively coupled or physically coupled to the switcher module 100 or third module 200. In an exemplary embodiment, the primary display is configured to always be on so that a document or other evidence may be positioned and see before it is shown. When the evidence is ready to be shown, the system may be controlled by the videographer (through the switcher module, for example) or by a remote control or control on the primary video display to display the primary image on the other display devices.

FIG. 4 illustrates an exemplary configuration of a display device having dedicated control regions for manipulating one or more images on one or more of the display devices. In an exemplary embodiment, a touch input display may include a plurality of dedicated control regions. The touch input is configured such that when a user touches one of the dedicated control regions, a setting or function of the one or more displays and/or system is automatically set. For example, when a user presses the upper right corner, F, the screen may freeze the present image. Other controls may include, for example, undo (U), recall (R), save (S), clear/erase (E), highlight/pen toggle (H), and color selection (C). In an exemplary embodiment, the touch screen may permit a user to annotate the image on the screen. The user may therefore select a color and/or feature, such as highlight (or toggle between highlight and pen), and then incorporate lines, shapes, colors, and other markings or annotations on the displayed image. For example, a user may freeze an image on the screen, select circles to indicate positions on the frozen image, change colors and draw lines or free forms on the image, and then save the annotated image. The system may therefore save image as displayed on the one or more displays as the original image from an input device and/or as the annotated image as seen on the display device. The display device may also be cleared or changed between input devices such that different images may be viewed from different input devices, or a blank screen may be displayed for use as a white board for free form creations. The different inputs from different displays may be aggregated to form a single image, such that a first user may add annotations from a first display device and a second user may add additional annotation from a second display device, and the aggregated image displayed from and/or saved to the system.

In an exemplary embodiment, each of the display devices have two inputs to the display device. A first input may include an image stream as received from the one or more input devices. For example, a first input to the display devices may be from the evidence camera 208. The input may be selectable, such as for example, through one or more controls of the switch device. A second input may include a blank signal, for example, for that of a black or white screen. The blank signal may be used such that a clean output is always received at the recording device and/or at the display device. In an exemplary embodiment, when a user positions evidence to be captured at the evidence camera 208, a user, through the switcher module 100 or other controller, may display the image on the display devices. The display may be linked to a picture-in-picture selection for the real time video editing, such that an intermediate production video is created with a combination image of the deponent and displayed evidence on the screen. Once the discussion is removed from the recorded evidence, the user may deselect showing the image on the display devices. The display devices may therefore show the second input signal of a black or white screen. The system may automatically or separately controlled to similarly remove the real time incorporation of the picture in picture. Therefore, the real time edited version of the video may include just the image as captured by the deponent's camera. The exemplary configuration may therefore be used to protect the inadvertent disclosure of information that may be accidently displayed on an evidence camera as documents and other evidence is shuffled between exhibits. The blank screens displayed when evidence is not being displayed also may be used to reduce distractions during the deponent questioning.

In an exemplary embodiment, the switcher module may be used to switch/transition between one or more video inputs or cameras of the switcher module or third module for the picture in picture view. The transition may be initiated by the attorney pressing a button or the videographer using a button mounted on the switcher module. In an exemplary embodiment, the switcher module includes selectable switches for type of transition, ie. dissolve, cut, key and PIP insert. Another single button, or multi option control may be mounted at or communicate with either the switcher module, third module, or remote control to permit control of the display device and viewing of the input from the third module by the attorney.

The remote end connection of the third module may feature multiple high-definition digital video inputs that can be connected to document camera(s) or presentation computer(s) or other input devices. There may be a digital video splitter that splits the signal that is showing the exhibit, to three or more participant monitors and the recorders described herein. The participants may therefore view the exhibits electronically as opposed to having paper copies. Exemplary embodiments also permit the secondary recording of the displayed images in in high-definition. Exemplary embodiments include a connection breakout box in the third module that is the end of a 15' cable and features a power tap for all devices and a digital video distribution amplifier to feed the monitors and system components.

In an exemplary embodiment, the third module 200 may include electronics, components, and other components to support the integration or the various modules and/or functions described herein. In an exemplary embodiment, the third module 200 may also include a video processor such as an HDMI video distribution component 214, video switcher 216, annotation feature 222, server, computer processor, hot spot wireless communication console, network connection, router, etc. The third module 200 may also include a speaker 210 to play sound associated with the one or more input devices. The system may be configured to capture and/or record the speaker signal at the source to provide a clearer recording, instead of recording a sound signal projected from the audio speaker and recaptured by a microphone. The third module 200 may also include one or more connectors for other input/output devices 220. Any combination of input/output device connectors may be included to achieve a desired function. Input/output device connections 220 may include connectors for power, data, and other transfer. Exemplary embodiments may also include either a printer port and/or printer for providing a copy of evidence created or captured during the deposition exchange, such as from images generated by the real time annotation of displayed images on the one or more display devices.

In an exemplary embodiment, the third module 200 comprises a housing for containing the components in a stowed configuration and a deployed configuration. The housing may comprise a removable lid and a base. The base may support and directly connect to one or more of the enclosed components. The lid may be configured to support and couple to the base in alternative configurations to act as a stand of the base portion. For example, the lid may include a mated surface along a top and/or on one or more lateral sides of the lid. The base may include a corresponding mated surface along its bottom surface for mating to the lid. The lid may also include skid pads or other supports to retain and support the lid on the floor or other flat surface. Therefore, the lid may be used when a table or other surface is not available for deploying the third module. The housing may include one or more extendable surface that may act as additional support surfaces for the one or more other components or for use during the deposition. For example, an extendable portion may slide out of a wall of the base to support one or more of the additional cameras, such as for use with displaying evidence, such as documents.

Figure 5A:
FIG. 5A is an exemplary cart for transporting the modules described herein.
Figure 5B:
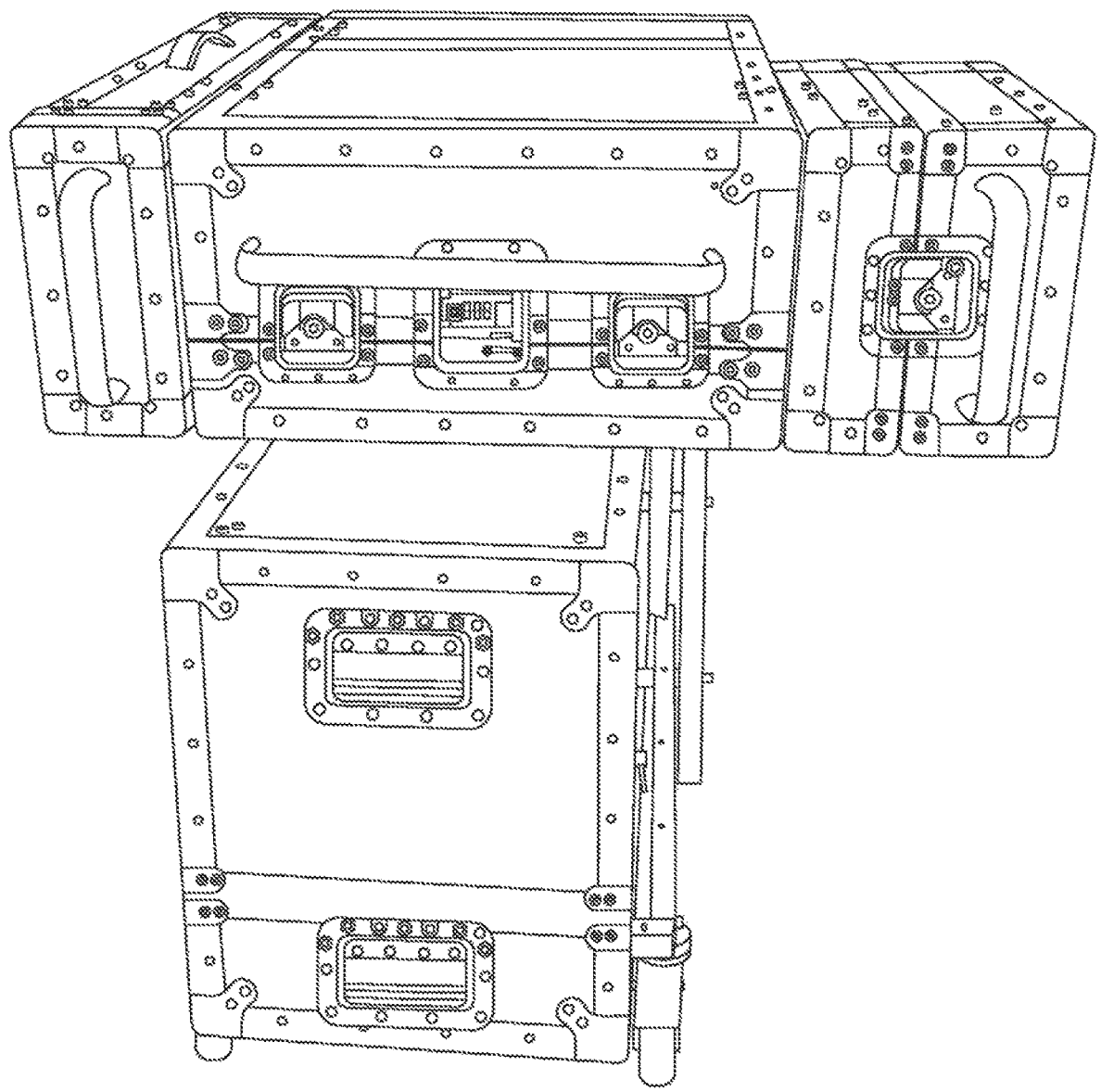
FIG. 5B is an exemplary connectable arrangement of the modules for transport.

FIG. 5A is an exemplary cart for transporting the modules described herein. The cart may be configured to permit the arrangement of a complete set of modular components to fit and be transported together. FIG. 5B is an exemplary connectable arrangement of the modules for transport. In an exemplary embodiment, the one or more modular units include attachable or mated surfaces to permit the direct attachment of one modular component to another module component. One or more of the modular components may include wheels, such that an entire set of modular components may be attached and transported together without additional equipment.

Exemplary embodiments described herein therefore provide a module digital recording system. Exemplary embodiments may also be used to record a deposition session and permit on the fly editing of a recorded session. Exemplary embodiments described herein include methods of recording a deposition, methods of on the fly editing of deposition video files, creating an event record, and methods of using the system described herein.

In an exemplary method of using the system to record a deposition session, the system is set up at a location. The camera is positioned relative to the deponent and/or orientation of the deponent to any evidence or sight direction as appropriate or desired. In an exemplary embodiment, the camera is arranged such that the deponent is centered and aligned such that when the picture in picture is used with a second camera system, the recorded deponent video image appears to be directed toward the picture in picture of the evidence the deponent is reviewing. The rest of the system is deployed by turning on the system, connecting the appropriate cables between the modules, and opening and deploying one or more of the modules.

When the deposition is initiated, the videographer starts the various recording devices simultaneously by pressing a one-button start/stop input. The one button input sends signals through the one or more modular connections to each of the audio and video recorders. A contemplated system connects a switcher module into the primary module such that the switcher module is controlled by the one-button start/stop technology, starting and stopping all connected video recorders simultaneously, which allows the video operator to go on and off the record quickly and efficiently with confidence, and reduces the chance of a recording error.

In an exemplary method of real time editing of a video recording, the videographer may select one or more video sources to record, and/or one or more display configurations. For example, the videographer may select the deponent video feed as a primary video signal, and an evidence video feed from a secondary camera as a secondary video signal. The system may then be configured to toggle between a video signal of just the deponent in full screen or a picture in picture arrangement with the deponent and the evidence together. When the topic of discussion moves away from the evidence, the videographer may select to return to just the deponent video feed. The method of real time editing of a video recording, may also include selecting combinations of one or more audio channels for recording.

Exemplary embodiments of using the system may include real time presentation and manipulation of displayed evidence. When evidence is displayed to a deponent, the evidence may be positioned within the line of sight of a secondary camera. When ready the videographer and/or attorney may manipulate one or more controls on the primary module, switcher module, third module, video device, remote control device, secondary camera and any combination thereof to display the image on the one or more displays. The selection of display may be integrated with or separate from the picture in picture recording. Therefore, the selection to display the evidence on the display may also initiate the picture in picture recording. Alternatively, these controls may be separate. Through manipulation of a control console, remote control device, display device, third module, switcher module, or other controller, the displayed image from the secondary image source or camera may be manipulated on screen. For example, the image may be zoomed, moved, rotated, annotated, etc. The deponent, attorney, court reporter, videographer, or a combination thereof may save images for capturing into the record. The system may also be configured to mark saved images with Exhibit identifiers or numbers.

Exemplary embodiments described herein may also be used to generate a deposition event record of the proceeding. The deposition event record may include a computer spreadsheet log that is controlled by a HID (Human Interface Device) and converts one or more commands through the one or more modules or system components into automatic electronic log entries. For example, the system may automatically log deposition events including "on the record", "off the record", "display exhibit", "remove exhibit", "audio channel one", "audio channel two", and other programmable entries for events such as when an entry indicating an attorney speaking over the deponent and a need to redact the interfering audio at a future time and any other pertinent events helpful to creating a complete record. Some of the event records may be directly associated or tied to one or more controls of the modular system. For example, when the one button system is used to start and stop the recorders, an automatic on or off record stamp is logged. Since all of the recorders are synchronized to the same start/stop through the one button initiation, the same time reference may be used to associate a time stamp to the respective event. The primary, switch, or third modules may also include one or more programmable event recording options. For example, one or more buttons may be reserved on the primary module or switcher module control panel to permit a user to identifying other events of interest. The system may permit a user to enter a key or description to associate text with the event or may simply record a generic reference to each of the buttons, which may be annotated or updated later.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A recording system, comprising:
   a first display;
   a second display;
   a first recording device;
   a first video camera;
   a second video camera;
   a first microphone;
   a second microphone;
   a third microphone; and
   a control console, the control console having a first input configured to select a video recording input to include image data from both the first video camera and the second video camera or to include image data from only the first video camera, wherein the video recording input of both the image data from the first video camera and the second video camera is a picture in picture image.

2. The recording system of claim 1, wherein the system is configured to record two separate stereo audio signals from the first microphone, the second microphone, and the third microphone.

3. The recording system of claim 2, where a first stereo audio signal is configured to be recorded on both audio channels from the first microphone, and a second stereo audio signal is configured to be recorded from a monaural channel from the second microphone and a monaural channel from the third microphone.

4. The recording system of claim 1, wherein the system is configured to selectively record one or two audio signals from a combination of the first microphone, the second microphone, or the third microphone, and the selection is possible between two audio signals recorded monaural, two audio signals recorded stereo, one audio signal recorded monaural and a second audio signal recorded stereo.

5. The recording system of claim 1, wherein the control console is configured to receive at least one input from a user to control a combination of signals to be recorded originating from the first video camera, the second video camera, the first microphone, the second microphone, the third microphone, or a combination thereof.

6. The recording system of claim 1, wherein a second input of the control console is configured to select an audio recording input to include audio data to be recorded originating from the first microphone, the second microphone, the third microphone, or a combination thereof.

7. The recording system of claim 1, further comprising an output conduit having a multiple cables for connection to a reporter console.

8. The recording system of claim 7, wherein the multiple cables includes a first cable terminating in a headphone jack for providing undelayed audio for headphone monitoring, a second cable for providing a live digital audio feed, and a third cable configured to couple to a microphone input jack.

9. The recording system of claim 8, further comprising an audio mixer comprising voice limiter, audio distribution amplifier, line level correction.

10. The recording system of claim 1, further comprising a stereo audio delay unit configured to synchronize a live audio feed with a delayed video feed recorded to the first recording device.

11. The recording system of claim 1, further comprising a universal control button for starting, stopping, and pausing the first video camera, the second video camera, the first microphone, the second microphone, and the third microphone simultaneously.

12. A recording system, comprising:
a first display;
a second display;
a first recording device;
a first video camera;
a second video camera;
a first microphone;
a second microphone;
a third microphone;
a control console; and
a stereo audio delay unit configured to synchronize a live audio feed with a delayed video feed recorded to the first recording device.

13. The recording system of claim 12, wherein the system is configured to record two separate stereo audio signals from the first microphone, the second microphone, and the third microphone where a first stereo audio signal is configured to be recorded on both audio channels from the first microphone, and a second stereo audio signal is configured to be recorded from a monaural channel from the second microphone and a monaural channel from the third microphone.

14. The recording system of claim 12, wherein the system is configured to selectively record one or two audio signals from a combination of the first microphone, the second microphone, or the third microphone, and the selection is possible between two audio signals recorded monaural, two audio signals recorded stereo, one audio signal recorded monaural and a second audio signal recorded stereo.

15. The recording system of claim 12, wherein a first input of the control console is configured to select a video recording input to include image data from both the first video camera and the second video camera or to include image data from only the first video camera.

16. The recording system of claim 15, wherein a second input of the control console is configured to select an audio recording input to include audio data to be recorded originating from the first microphone, the second microphone, the third microphone, or a combination thereof.

17. The recording system of claim 12, further comprising an output conduit having a multiple cables for connection to a reporter console, wherein the multiple cables includes a first cable terminating in a headphone jack for providing undelayed audio for headphone monitoring, a second cable for providing a live digital audio feed, and a third cable configured to couple to a microphone input jack.

18. The recording system of claim 12, further comprising a universal control button for starting, stopping, and pausing the first video camera, the second video camera, the first microphone, the second microphone, and the third microphone simultaneously.

* * * * *